C. C. WALWORTH.
Pipe Fitting Machine.
No. 25,779.
Patented Oct. 11, 1859.
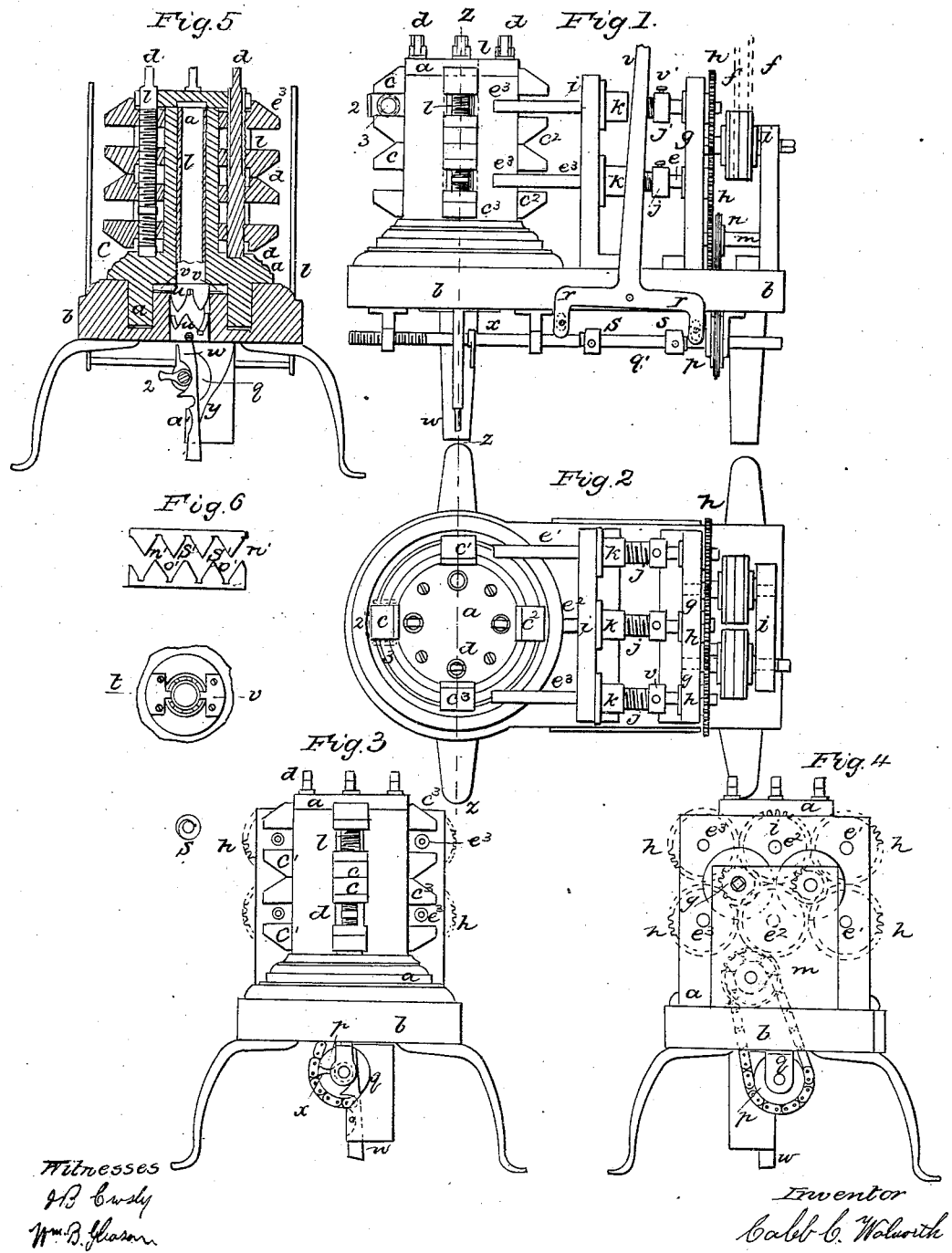

UNITED STATES PATENT OFFICE.

CALEB C. WALWORTH, OF BOSTON, MASSACHUSETTS.

CUTTING SCREW-THREADS ON PIPE-FITTINGS.

Specification of Letters Patent No. 25,779, dated October 11, 1859.

*To all whom it may concern:*

Be it known that I, CALEB C. WALWORTH, of Boston, in the county of Suffolk and State of Massachusetts, have invented certain new and useful improvements in machines for cutting screw-threads and for performing other cutting and finishing operations, which machines may be used in the manufacture of pipe-fittings, bolts, nuts, and other objects; and I do hereby declare that the following, taken in connection with the drawings which accompany and form part of this specification and in which similar letters refer to similar parts, is a description thereof so full and exact as to enable those skilled in the art to practice my invention.

This relates to certain novel arrangements of machinery by which I am enabled, first, to operate successively on different ends of pipe fittings, in such a manner that the angular distance between the ends of each fitting is determined, and so that fittings may be placed in and removed from the mechanism, while other parts of it are operating on other fittings; second, to govern the endwise movements of the mandrels, carrying the cutting tools, and to confine the linear distance of their movement to an amount but slightly in excess of the length of the surfaces operated upon by the cutting tools; third, to cause the jaws of several separate vises to approach or recede from the objects to be held in or released from them by a rotative movement, common to and actuating each of the several pairs of jaws, while I am at the same time enabled to cause each pair to grip or release the objects operated upon by them in such a manner that the full force of the operation increased by the mechanism, may be exerted on one pair of jaws at a time if this is required, and also when no requirement for this amount of power exists, to move the jaws of all the connecting vises in common; fourth, to combine several sets of mechanisms, each set consisting of a vise, or of vises, and its or their coöperating mandrel or mandrels, arranged to operate cutting tools in planes of action one beyond another, to increase the capacity of the machine.

My invention consists in the arrangements and combinations of the mechanical means described hereinafter and shown in the drawings, or their substantial equivalents which I employ to effect the before mentioned and other objects, which together enable me to produce "fittings" in greater quantities and at less cost than formerly.

Figure 1 is a side view of a machine embodying my invention. Fig. 2 is a plan, and Figs. 3 and 4 are front and rear views of the same. Fig. 5 is a cross section, taken in the line $z\ z$, shown in Figs. 1 and 2. Fig. 6, is a development of the cam which assists in the rotation of the chuck. Other parts represented in detail are lettered as in the above figures, where they are represented in the general arrangement, and throughout the drawings similar characters refer to similar parts.

A compound revolving chuck or vise ($a$), is arranged upon the bed ($b$) of the machine, so that it may be made to rotate and also to have a vertical movement or other movement for a purpose to be explained hereafter. This chuck bears the gripping jaws ($c$) which are made to approach, and recede from each other in pairs by the rotation of shafts on which right and left hand screw threads are cut, matching suitable female threads, formed in that part of the jaws which fits within and is guided by the recesses formed within the chuck for that purpose. The drawings represent but two pairs of jaws one over the other. It is evident however that this number may be increased as desired by extending the length of the chuck and making the obvious changes required in the tubular arrangement hereinafter described for operating the screws actuating each pair of jaws employed. The screws which operate the lower pair of jaws are cut upon or are made fast to the spindle ($d$). Both the tube ($l$) and the spindle are adapted to be operated on by the same wrench, so that by slipping it upward only the spindle is turned by rotation of the wrench. By rotating ($d$) the lower jaws can be made to assume any desired position, so that if they are set a little farther apart than are the upper jaws, it will be evident that of two objects of the same size, placed one between the jaws of each vise, when the wrench is rotated encompassing both ($d$) and the tube ($e$) which surrounds it, the one placed in the upper vise will be first gripped by nearly the whole force exerted upon the wrench. If the wrench is then raised, the whole force exerted through it will act upon the object held in the lower jaws.

Inspection of the drawings will show that the spindle (*d*) and the tube (*l*) are cut away upon two sides, only to fit the hole in the wrench adapted to embrace them, and that this end of each tube, must be farther from the end of the spindle, than the end of that which it envelops.

The hole in the wrench is made long enough to embrace any number of tubes which may sourround (*d*) but the distance apart of the sides of the embracing portions of the wrench is made sufficient only to fit upon the parallel sides of the spindle and tubes where they are cut away for that purpose. Rotation of the wrench therefore, will rotate the whole of the tubes, and the spindle (*d*) or a part of them, as it may by movement in their axial line encompass one or more.

When it is desired to release the objects from the hold of the vises, if the wrench is used first on the spindle and then successively on each screw cut tube where there are more than two vises one beyond the other, each object held in the vises will be released in turn, beginning with the lowest one. By continuing the rotation of the wrench when it encompasses each screw cut tube, and spindle actuating the vises, all the jaws recede sufficiently to release the several fittings, and the vises will be left in position to receive new objects, which are fixed in the jaws as follows. The wrench still encompassing the end of each screw, rotates all the screws together, until the upper fitting is gripped, when the wrench is slipped from the screw actuating the first or upper jaws, and by a little further rotation the next fitting is gripped and so on, if there are more than two pairs of jaws in the series.

The action above described contemplates that the size of the fittings in the direction of the openings of the jaws, is nearly uniform. It will be seen therefore, that the arrangement just described enables me to secure and release a number of fittings in a rapid manner and more effectually, than I should otherwise be enabled to do, if it were necessary to grip or release all the fittings at the same moment, and to avoid the difficulties which would arise from slight irregularities in size of the fittings, providing the jaws were all so connected together, that one pair of them could not be moved without moving the others. It may be said of pipe fittings, that their openings or branches are at the angular distances from each other of 90° and 180° with occasional exceptions.

The machine herein described, in which my invention is embodied, is designed to operate on the bulk of fittings produced and in which the openings are in the same plane with each other, and disposed relatively in the angular arrangement mentioned.

By inspection of the drawings, and particularly of Fig. 2, it will be seen that the mandrels (*e*) (which are fitted at their ends nearest the chuck (*a*) in the manner usual in many machinists' tools for receiving cutting instruments) are arranged parallel with each other, and in the axial lines of the openings of the fittings presented toward the mandrels. In practice I make provision in the jaws (*c*) by which I can so affix to them such molds as will by their correspondence to the shape of the fittings, bring them up on the approach of the jaws into that position, required for the action of the tools borne by the mandrels.

A common tee fitting is represented in red lines Fig. 2, as held in jaws (*c*). When chuck (*a*) is rotated 90°, so that the fitting will be held as in jaws (*c'*) the end of the fitting marked 1, will be in position to be operated on by mandrel (*e'*), when at (*c²*) end 2 will be presented to mandrel (*e²*) when at (*c³*) end 3, will be presented to mandrel (*e³*) and when the rotation of the chuck (*a*) shall bring the fitting back from whence it started, the required operations having been performed upon each of its ends in succession, it and all others in the same series, may be removed and others placed in their stead. From this it will be perceived that operations may be performed upon as many series of three fittings in the same plane, during the time of the removal and replacement of a fourth, as it may be found convenient to combine in planes one beyond the others, all revolving around one common axis, and that fittings may be completed and removed at every rotative movement of the chuck through 90°. While the series of vises and mandrels arranged in planes parallel to and one beyond the other, is limited to two in the drawings, this limit may be exceeded in practice, and the chuck may be guided at both ends in its movements, instead of at one as represented.

The mandrels (*e*) are rotated in either direction, by means of power applied through the belts (*f*) moving in the directions indicated. These rotate (as is usual in similar cases) pulleys fixed and loosed, upon shafts (*g*) which have fixed upon them pinions meshing into the gears (*h*) which are necked into and run in one of uprights (*i*). Two sets of tight and loose pulleys are shown on different shafts, (*g*) and through the pinions fixed thereon all the gears (*h*) are so connected that no one of them can rotate, without turning the others correspondingly.

The mandrels and gears are united by means of a feather and spline, so that the mandrels can be moved endwise while rotating. This endwise movement by which the tools are advanced into or along the objects on which they operate, and by which they are withdrawn therefrom by reverse rotation is obtained by means of the screws ($j$) fixed on ($e$) rotating therewith and in the nuts ($k$) fixed to the front upright. In some of the operations on fittings, it is requisite that the advance of the cutting tool, should bear a certain relation to its rotation, and this may be accomplished by changing both screws and nuts for those of different pitch, or by rotating in one direction or the other as the case may require, the nuts ($k$), which may be accomplished by means familiar to those skilled in the art, and which are not herein shown or described, as, forming no part of my invention, it would unnecessarily complicate this specification.

Having described that part of the mechanism by which the fittings are held, to be operated upon, and their angles determined with exactness, I will now describe the mechanical means by which I accomplish the rotation of the chuck or vise, and reverse the rotation of the mandrels. The shaft ($m$) which bears the rag wheel ($n$) is rotated in one direction or the other by the gear ($o$) and the chain shown in the drawings transmits the rotation of ($m$) through the rag wheel ($p$) to the shaft ($q$) which by means of a feather and spline, is permitted to have an endwise movement. Suitable bearings fixed to ($b$) and shown in the drawings sustain ($q$) and prevent endwise movement of ($p$). In the bearing placed directly under jaws ($c$) is cut or placed a nut which corresponds with the screw formed on that end of ($q$) passing through it, so that it will be seen that any rotation of ($q$) must be attended with its endwise movement. The levers ($r$) are pivoted to ($b$) and are connected to each other by bars directly under ($b$), and over ($q$). They are also connected (by means not shown) to any common apparatus for shipping the belts, ($f$) upon the tight and loose pulleys, by which the direction of the rotation and endwise movement of the mandrels ($e$) and shaft ($g$) is changed.

The spiral cams ($s$) are arranged to be adjusted as desired, on the shaft ($q$) and by this adjustment the time of rotation of ($e$) and ($q$) in either direction is determined. For it will be obvious that as the cams ($s$) are placed between the bars uniting (22,) endwise movement will bring the bars and cams into contact, when the rotation of the cam will reverse the position of the lever, which acting on the belts reverses the direction of rotation of ($q$). The lever will remain in position till the other cam acts upon the bar over it, reversing the position of the lever in the manner before described, and consequently the direction of rotation of ($q$) and ($e$). The nearer together the cams ($s$) are fixed, the shorter will be the time of rotation in one direction. The chuck ($a$) has a cylindrical bearing in the bed ($b$) to guide it in its movements, and it may also have a bearing at its other extremity, to aid in its support.

In Fig. 5, may be seen a central spindle around which ($a$) is free to rotate, but through which vertical movements are imparted to the chuck, the end of the spindle being headed, and covered by a cap fixed to ($a$). Fixed to the chuck and surrounding the spindle, is the tube ($t$) which bears the grooved cam ($u$) the lower part thereof being removable so that the mechanism can be put together. This cam is developed below Fig. 5, to show the relation of its points and inclines to each other, which by their action on the studs fixed on ($b$) together with the vertical movements of the chuck, gives the latter an intermittent rotative movement.

The chuck is raised at or soon after the time when the cutting tools are drawn clear from their work, so that it will not be necessary to lose time in withdrawing them further, to escape contact of the work with the tools in the rotative movements of the chuck. The chuck is raised sufficiently to bring the spaces below the lower jaws of the vises opposite the cutting tools, advantage being taken of this upward movement, and the descent of the chuck into its normal position, to rotate it 90°. The piece ($w$) is hinged to the spindle in the chuck, and is made of such form on that edge nearest the chuck center, that the arm ($x$), in its advance rotation, will engage with the projection on ($x$), elevating the chuck. As the arm in its continued rotation withdraws from the projection, the spring ($y$) located within the case which steadies ($w$) and prevents it from turning thrusts forward, so that its end rests upon ($a'$) keeping the chuck elevated, till the described action of the cam ($s$) reverses the rotation of ($q$) when the arm ($x$) strikes against ($w$) forcing it off of ($a'$) against the action of ($y'$) when the chuck descends. When the chuck is in its normal position the studs ($v$) are in the recesses ($n'$). The first vertical movement of the chuck is unaccompanied with rotation, and is of the distance from ($n'$) to the incline ($o'$) which is sufficient to place the spaces before mentioned below the vises opposite the tools. Further vertical movement of ($a$) forces the inclines ($o'$) against ($v$) and turns ($a$) about 45°; the chuck then descending its movement is vertical until the inclines ($s'$) strike against ($v$) by which the remainder of the rotation of 90° is effected.

The mandrels ($e$) being connected with the screw threads which advance them, would require considerable time to be withdrawn by rotation, sufficiently far to permit of the rotation of the chuck. The chuck however, might be withdrawn on a line parallel or nearly so with the axis of the mandrels, and might be rotated before the work was again submitted, to the action of the cutting tools. The mandrels may be adjusted with regard to the requirements of the work, or the length of the tools employed, by means of the set screw ($v'$) or, by slackening the screw, any of the mandrels can be kept from operation.

The mechanism which I have described for rotating the chuck, and for moving it, to lessen the amount of traverse of the mandrels, which would otherwise be requisite in order to rotate the chuck, together with that for shipping the belts, or otherwise changing the direction of rotation of the mandrels, may be very much varied from that which I have described, which is however that used by me with success.

Having thus described my invention, I claim—

1. The combination of two or more mandrels, parallel or nearly parallel to each other, and arranged to carry cutting tools, with two or more vises when these are arranged to revolve around a common center.

2. I also claim the combination of two or more sets of mandrels, as above, with two or more sets of vises as above, when each set of mandrels is arranged to operate in unison with its corresponding set of vises.

3. I do not herein intend to claim the arrangement of two or more vises so as to revolve about a common center, and locking the same in any desired position, as such an arrangement was described by me in the American Patent numbered 15862, and in the English Patent, numbered, but I do claim the combination of two or more series of vises one beyond the other, and arranged to revolve about a common center.

4. I also claim operating two or more vises independently of each other or together, by one wrench and by the means and in the manner substantially as specified.

CALEB C. WALWORTH.

Witnesses:
J. B. CROSBY,
FRANCIS GOULD.